United States Patent
Mak

(10) Patent No.: US 11,057,118 B2
(45) Date of Patent: Jul. 6, 2021

(54) INDOOR LOCALIZATION WITH BEACON TECHNOLOGY BASED ON SIGNAL STRENGTH DISTRIBUTION AND DEEP LEARNING TECHNIQUES

(71) Applicant: Intel Corporation, Santa Clara, CA (US)

(72) Inventor: Hong Beng Mak, Bukit Minyak (MY)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/862,177

(22) Filed: Apr. 29, 2020

(65) Prior Publication Data
US 2020/0259570 A1  Aug. 13, 2020

(51) Int. Cl.
| | |
|---|---|
| H04B 17/10 | (2015.01) |
| H04B 17/23 | (2015.01) |
| H04W 4/029 | (2018.01) |
| G06N 20/00 | (2019.01) |
| G06N 3/08 | (2006.01) |
| G06N 5/04 | (2006.01) |
| H04W 4/33 | (2018.01) |

(52) U.S. Cl.
CPC .............. *H04B 17/10* (2015.01); *G06N 3/084* (2013.01); *G06N 5/046* (2013.01); *G06N 20/00* (2019.01); *H04B 17/23* (2015.01); *H04W 4/029* (2018.02); *H04W 4/33* (2018.02)

(58) Field of Classification Search
CPC ......... H04B 17/10; H04B 17/23; H04W 4/33; H04W 4/029; G06N 20/00; G06N 3/084; G06N 5/046
See application file for complete search history.

(56) References Cited

U.S. PATENT DOCUMENTS

| | | | |
|---|---|---|---|
| 2015/0358781 A1* | 12/2015 | Chen | H04W 4/023 455/456.1 |
| 2020/0167734 A1* | 5/2020 | Hoofard | B65G 69/28 |
| 2020/0245287 A1* | 7/2020 | Nelson | G06N 3/02 |

OTHER PUBLICATIONS

E. Malekzadeh et al., "An Untimed SystemC Model of GoogLeNet," Published 2019, 13 pages, Center for embedded and Cyber-Physical Systems, University of California Irvine.
Wikipedia, "Received signal strength indication", <en.wikipedia.org/wiki/Received_signal_strength_indication>, retrieved Mar. 31, 2020, 3 pages.
N. Siegel, TI Designs Bluetooth Low Energy (BLE) Beacons Reference Design, Sep. 2016, 8 pages, Texas Instruments, Inc.
H. Quassim et al., "Compressed Residual-VGG16 CNN Model for Big Data Places Image Recognition," IEEE 8th Annual Computing and Communication Workshop and Conference, Feb. 27, 2018, 7 pages, IEEE, Las Vegas, NV.

* cited by examiner

*Primary Examiner* — Nguyen T Vo
(74) *Attorney, Agent, or Firm* — Jordan IP Law, LLC

(57) ABSTRACT

Systems, apparatuses and methods may provide for technology that generates a real-time histogram image based on real-time signal strength indicator (SSI) information associated with a plurality of beacons adjacent to an indoor area. The technology may also input the real-time histogram image to a neural network and automatically determine a location of a mobile recipient of the real-time SSI information in the indoor area based on an output of the neural network.

25 Claims, 8 Drawing Sheets

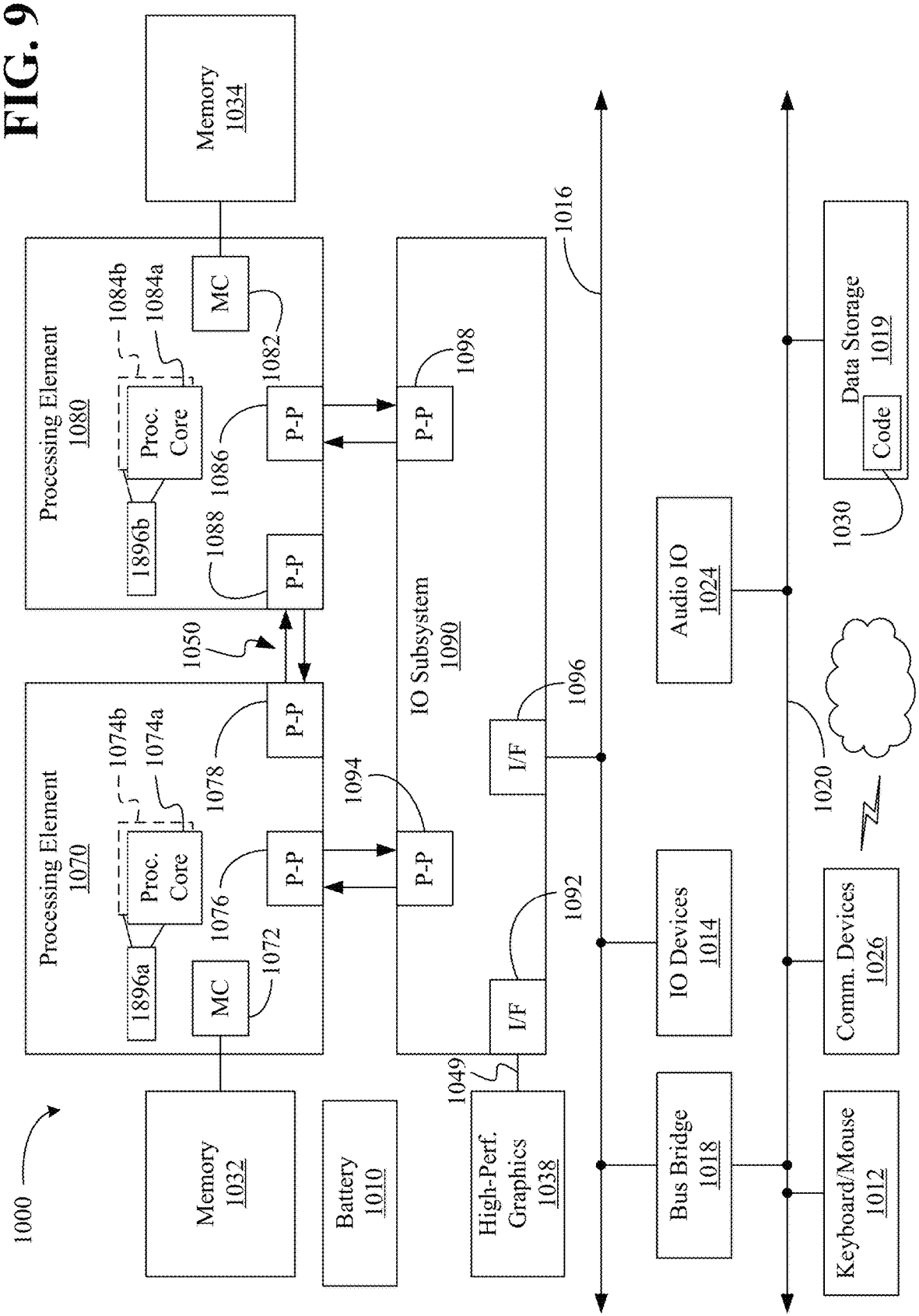

US 11,057,118 B2

INDOOR LOCALIZATION WITH BEACON TECHNOLOGY BASED ON SIGNAL STRENGTH DISTRIBUTION AND DEEP LEARNING TECHNIQUES

TECHNICAL FIELD

Embodiments generally relate to indoor localization. More particularly, embodiments relate to indoor localization with beacon technology based on signal strength distribution and deep learning (DL) techniques.

BACKGROUND

Indoor localization applications may be used for a variety of purposes such as tracking visitors in a museum, tracking patients in a medical facility, tracking and navigating vehicles through a "smart" parking garage (e.g., car park), and so forth. Traditional indoor localization solutions might use lidar, radar and/or three-dimensional (3D) image recognition technology to detect the objects being tracked. Such solutions, however, are typically costly in terms of equipment and/or installation and may consume a considerable amount of power. Lower cost solutions may have accuracy concerns due to the existence of multiple signal propagation paths and complex signal reflections/bounces.

BRIEF DESCRIPTION OF THE DRAWINGS

The various advantages of the embodiments will become apparent to one skilled in the art by reading the following specification and appended claims, and by referencing the following drawings, in which:

FIG. 9 is a block diagram of an example of a multi-processor based computing system according to an embodiment.

DESCRIPTION OF EMBODIMENTS

Figure 1:
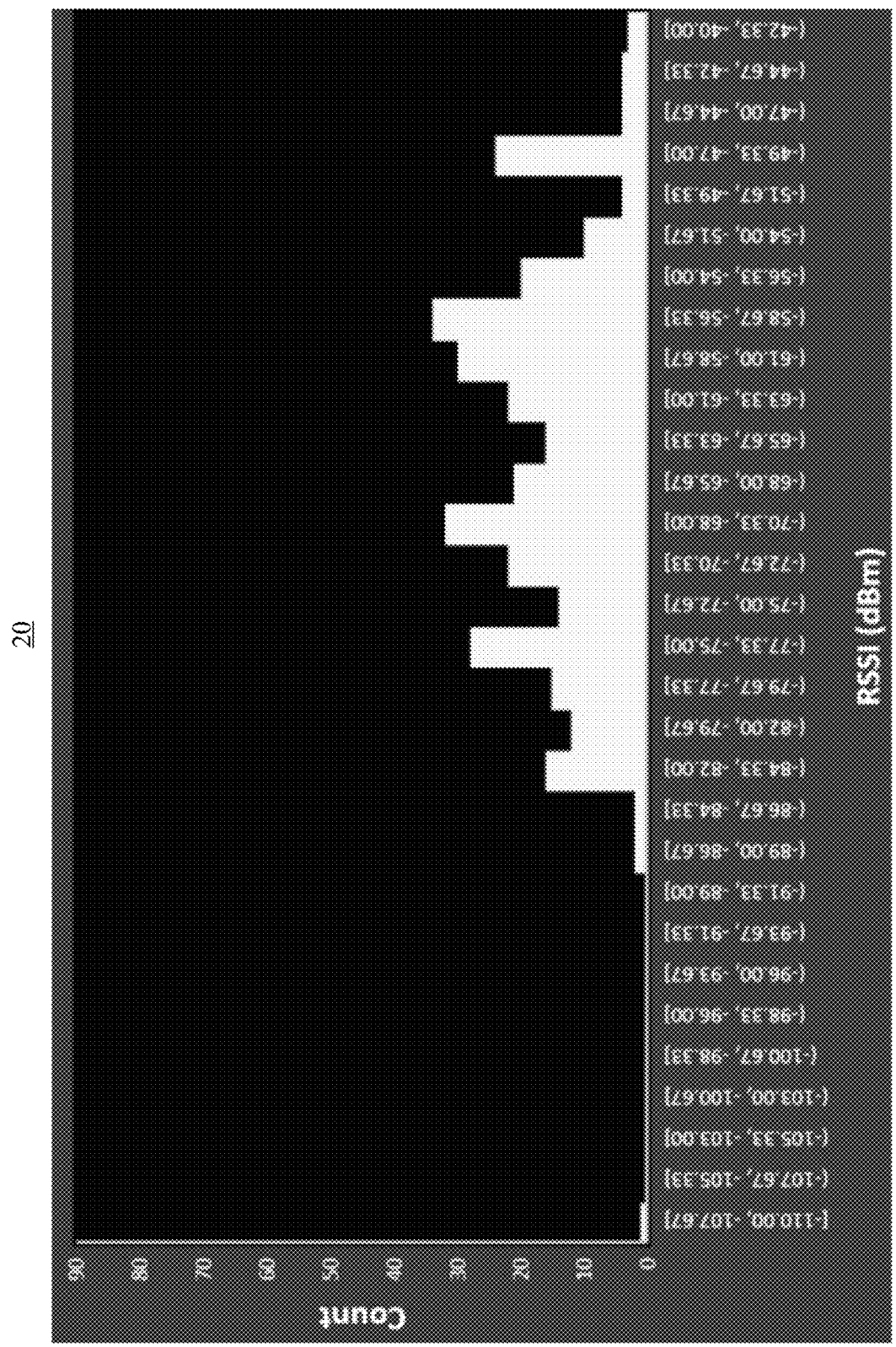
FIG. 1 is an illustration of an example of a histogram according to an embodiment.

Turning now to FIG. 1, a histogram 20 is shown, where the histogram represents a signal strength distribution of a plurality of wireless packets (e.g., BLUETOOTH low energy/BLE packets) received from a beacon. In the illustrated example, the histogram 20 includes a set of ranges (e.g., bins, buckets) such as −89.00 dBm to −86.67 dBm (e.g., first range), −86.67 dBm to −84.33 dBm (e.g., second range), and so forth. Thus, the number (e.g., count) of packets having a signal strength falling within the first range is the leftmost bar in the illustrated histogram 20, the number of packets having a signal strength falling within the second range is the bar immediately to the right of the leftmost bar in the illustrated histogram 20, etc. A certain number of packets (e.g., 1000 packets) may be consistently used to generate the histogram 20.

As will be discussed in greater detail below, the histogram 20 may be combined with histograms for other beacons to obtain a histogram image that represents a "signature" of a location in an indoor area (e.g., enclosed space lacking Global Positioning System/GPS access) such as, for example, a museum, medical center, smart parking garage, apartment, office, underground facility, etc., enclosed and/or encircled by the beacons. In an embodiment, a mobile recipient (e.g., smart phone, wearable device, robot, drone, etc.) of the wireless packets may be automatically tracked throughout the indoor area based on the signature information. The illustrated histogram 20 therefore provides an accurate and low cost solution to indoor localization. Indeed, with regard to accuracy, the measured signal strength distribution may be substantially different even if the position has changed by, for example, one meter.

Figure 2:
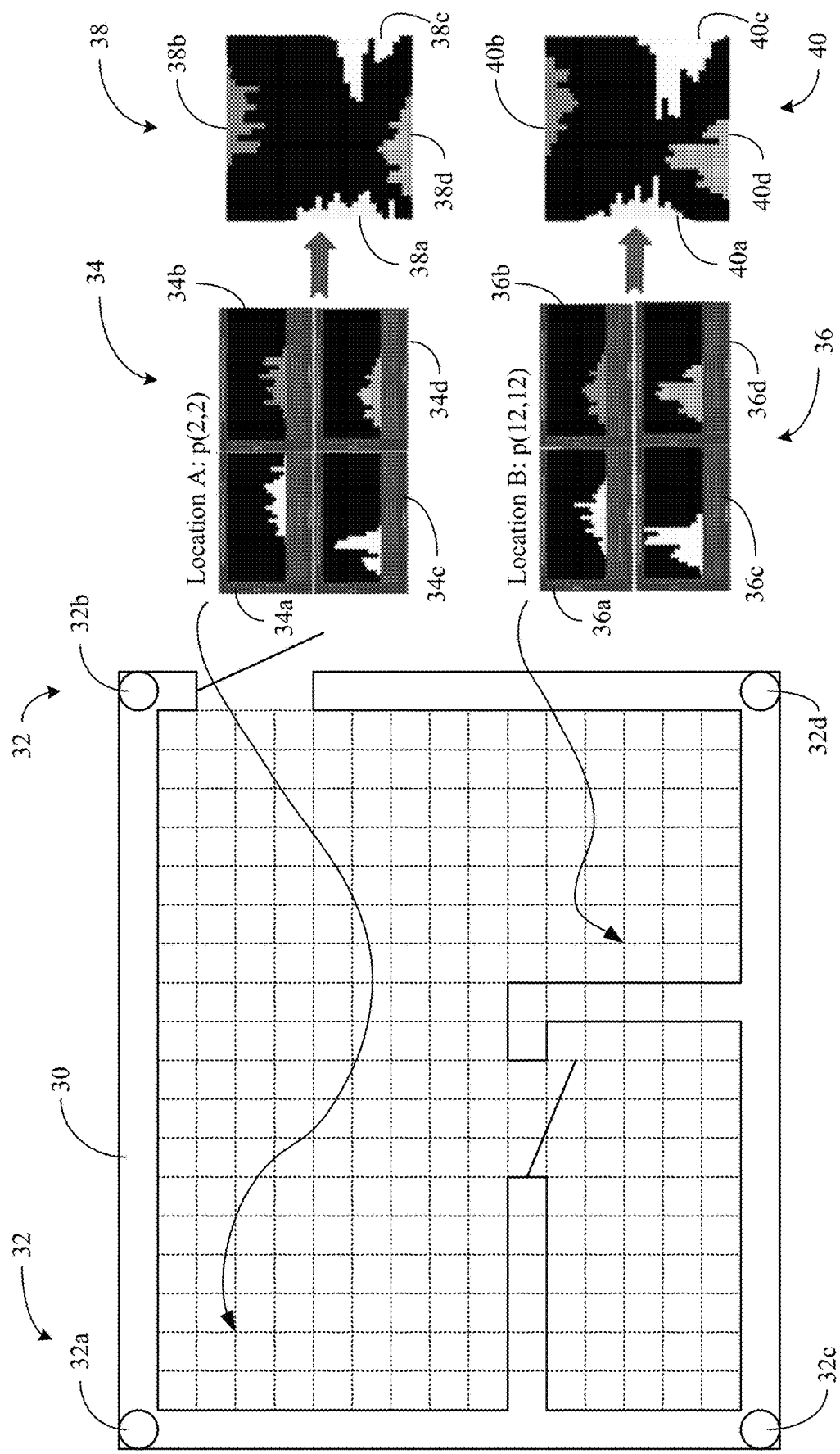
FIG. 2 is an illustration of an example of an indoor area, a plurality of beacons and multiple histogram images according to an embodiment.

FIG. 2 shows a plan view of an indoor area 30 (e.g., apartment, office) that is partitioned into a two-dimensional (2D) grid having vertical lines, horizontal lines, and intersection points (e.g., "grid points"). In the illustrated example, a plurality of beacons 32 (32a-32d, e.g., coin-battery powered BLE beacons) are installed in fixed locations around the perimeter of the indoor area 30. Each beacon 32 may periodically (e.g., on the same programmable time interval such as 350 ms) broadcast a wireless "advertisement" packet containing an identifier (ID) of the beacon 32. In general, signal strength indicator (SSI) information (e.g., received SSI/RSSI) is a measurement of the power in a received radio signal and may be derived in an intermediate frequency (IF) stage of a receiver (e.g., mobile recipient). A mobile recipient of the wireless packets may therefore extract the IDs and SSI information from the packets and generate histogram sets 34 (34a-34d), 36 (36a-36d) based on the extracted information.

For example, when the mobile recipient is at "Location A" in the grid (e.g., 2D grid point of 2, 2 if the origin of the grid is the top left corner). A first histogram set 34 may include a first histogram 34a associated with a first beacon 32a, a second histogram 34b associated with a second beacon 32b, a third histogram 34c associated with a third beacon 32c, and a fourth histogram 34d associated with a fourth beacon 32d.

In general, a histogram image 38 (38a-38d) may be generated based on the first histogram set 34. In the illustrated example, the first histogram 34a is rotated 90° clockwise to obtain a first rotated histogram 38a, the second histogram 34b is rotated 180° to obtain a second rotated histogram 38b, the third histogram 34c is rotated 270° clockwise to obtain a third rotated histogram 38c, and the fourth histogram 34d is left unrotated to obtain an unrotated histogram 38d. The rotational values are used to facilitate discussion and may vary depending on the circumstances. The first rotated histogram 38a, the second rotated histogram 38b, the third rotated histogram 38c, and the unrotated histogram 38d may be combined into the histogram image 38. Thus, the histogram image 38 may be considered to be a signal strength signature for Location A.

In an embodiment, the histogram image 38 is used to train a neural network such as, for example, a deep learning neural network having an input layer, one or more intermediate layers, and an output layer. In such a case, a robot or human operator might position a mobile device at each point in the grid, where the mobile device collects the SSI information, generates the histogram image 38, and automatically trains the neural network based on the histogram image 38. In another embodiment, the histogram image 38 is input to the trained neural network to obtain real-time (e.g., inference) localization results.

In one example, the first rotated histogram 38a, the second rotated histogram 38b, the third rotated histogram 38c, and the unrotated histogram 38d are automatically set to different color values. For example, the first rotated histogram 38a might be set to the color cyan, the second rotated histogram 38b may be set to the color magenta, the third rotated histogram 38c may be set to the color yellow, and the unrotated histogram 38d might be set to the color grey. Such an approach may enable the histogram image 38 to be more easily distinguished from histogram images associated with other 2D grid points (e.g., strengthening the uniqueness of the signature).

Additionally, automatically setting the transparency of the first rotated histogram 38a, the second rotated histogram 38b, the third rotated histogram 38c, and the unrotated histogram 38d to a non-zero value such as, for example, 25% may further strengthen the distinctiveness of the histogram image 38 by supporting visual overlap between the bars of the histograms 38a, 38b, 38c, 38d.

Similarly, when the mobile recipient is at "Location B" in the grid (e.g., 2D grid point of 12, 12 if the origin of the grid is the top left corner). A second histogram set 36 may include a first histogram 36a associated with the first beacon 32a, a second histogram 36b associated with the second beacon 32b, a third histogram 36c associated with the third beacon 32c, and a fourth histogram 36d associated with the fourth beacon 32d.

In general, a histogram image 40 (40a-40d) may be generated based on the second histogram set 36. In the illustrated example, the first histogram 36a is rotated 90° clockwise to obtain a first rotated histogram 40a, the second histogram 36b is rotated 180° to obtain a second rotated histogram 40b, the third histogram 36c is rotated 270° clockwise to obtain a third rotated histogram 40c, and the fourth histogram 36d is left unrotated to obtain an unrotated histogram 40d. Again, the rotational values are used to facilitate discussion and may vary depending on the circumstances. The first rotated histogram 40a, the second rotated histogram 40b, the third rotated histogram 40c, and the unrotated histogram 40d may be combined into the histogram image 40. Thus, the histogram image 40 may be considered to be a signal strength signature for Location B.

In an embodiment, the histogram image 40 is used to train a neural network. In such a case, a robot or human operator might position a mobile device at each point in the grid, where the mobile device collects the SSI information, generates the histogram image 40, and automatically trains the neural network based on the histogram image 40. In another embodiment, the histogram image 40 is input to the trained neural network to obtain real-time (e.g., inference) localization results.

In an embodiment, the first rotated histogram 40a, the second rotated histogram 40b, the third rotated histogram 40c, and the unrotated histogram 40d are automatically set to different color values. For example, the first rotated histogram 40a might be set to the color cyan, the second rotated histogram 40b may be set to the color magenta, the third rotated histogram 40c may be set to the color yellow, and the unrotated histogram 40d might be set to the color grey. Such an approach may enable the histogram image 40 to be more easily distinguished from histogram images associated with other 2D grid points (e.g., strengthening the uniqueness of the signature).

Additionally, automatically setting the transparency of the first rotated histogram 40a, the second rotated histogram 40b, the third rotated histogram 40c, and the unrotated histogram 40d to a non-zero value such as, for example, 25% may further strengthen the distinctiveness of the histogram image 40 by supporting visual overlap between the bars of the histograms 40a, 40b, 40c, 40d.

Although the number of beacons 32 shown is four, a greater or lesser number of beacons 32 may be used. Indeed, increasing the number of beacons 32 beyond four may increase accuracy (e.g., with a potential tradeoff in equipment and/or installation cost).

Figure 3:
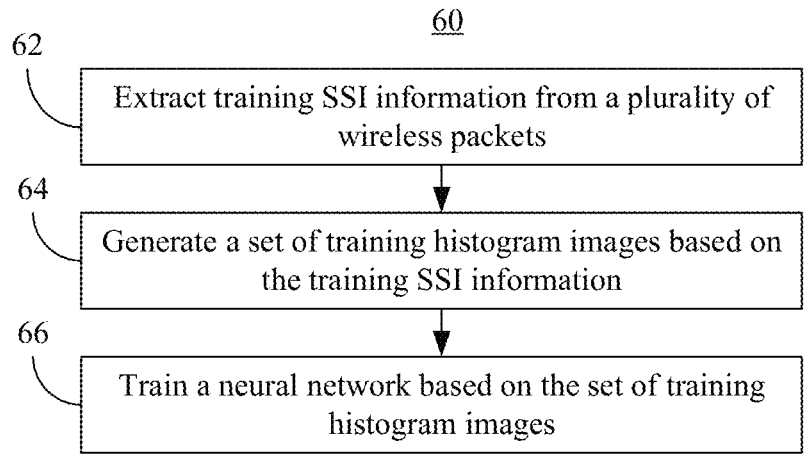
FIG. 3 is a flowchart of an example of a method of training a neural network to automatically conduct indoor localizations according to an embodiment.

FIG. 3 shows a method 60 of training a neural network to automatically conduct indoor localizations. The method 60 may generally be implemented in a mobile recipient of training (e.g., ground truth) SSI information and/or a computing system (e.g., edge node) in communication with such a mobile recipient. More particularly, the method 60 may be implemented in one or more modules as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof.

For example, computer program code to carry out operations shown in the method 60 may be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Illustrated processing block 62 provides for extracting training SSI (e.g., radio frequency/RF RSSI) information from a plurality of wireless packets such as, for example, BLE transmissions, wherein the wireless packets originate from a plurality of beacons adjacent to an indoor area. A set of training histogram images is generated at block 64 based on the training SSI information. Block 66 trains a neural network based on the set of training histogram images. In an embodiment, block 66 includes inputting the set of training histogram images to a deep neural network, setting weights of the neural network layers during a forward propagation of the images through the neural network, determining loss functions for the weights during a backward propagation of the neural network, and iteratively repeating the process until the loss function converges to an acceptable level. Example neural networks that might be used include AlexNet, GoogLeNet, VGG16, and so forth.

Figure 4:
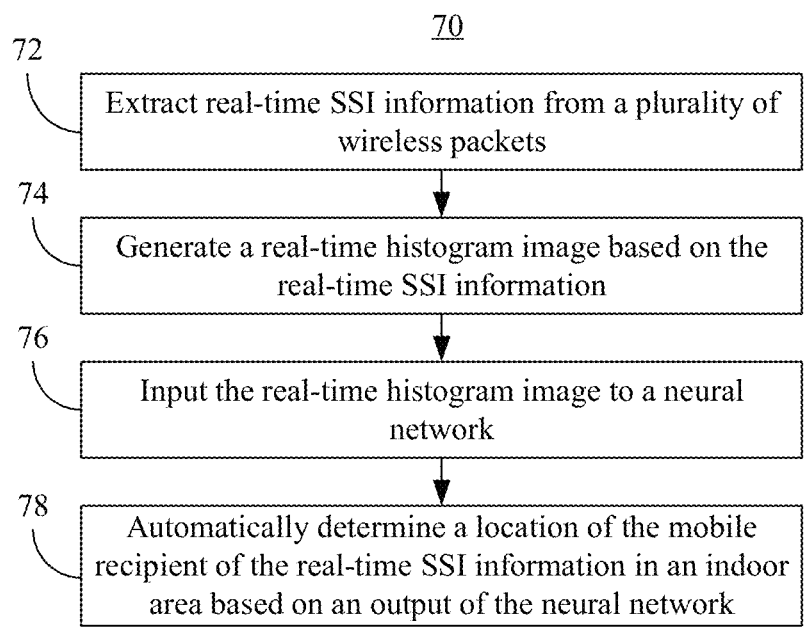
FIG. 4 is a flowchart of an example of a method of conducting real-time indoor localizations according to an embodiment.

FIG. 4 shows a method 70 of conducting real-time indoor localizations. The method 70 may generally be implemented in a mobile recipient of real-time SSI information and/or a computing system (e.g., edge node) in communication with such a mobile recipient. More particularly, the method 70 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 72 provides for extracting real-time SSI information from a plurality of wireless packets originating from a plurality of beacons that are adjacent to an indoor area. Block 74 generates a real-time histogram image based on the real-time SSI information, where the real-time histogram image is input to a neural network at block 76. In one example, the neural network is a deep learning neural network (e.g., AlexNet, GoogLeNet, VGG16, or other suitable convolutional neural network/CNN) having one or more intermediate layers between an input layer and an output layer. Block 78 automatically determines the location of the mobile recipient of the real-time SSI information in the indoor based on an output of the neural network.

In an embodiment, the output of the neural network is one or more grid points (e.g., 2D or 3D) with associated confidence levels. In this regard, accuracy may remain high even when the spatial environment changes over time. For example, adding a new sofa or dining table to the space may result in only slight changes to the shape of the histogram image. In such a case, a minor reduction in the confidence level associated with the neural network output might be experienced. Unlike other distance path-loss estimation models, however, complex mathematics calculations would not need to be repeated or redesigned to maintain accuracy.

The output of the neural network may be used to conduct further operations such as, for example, automated navigation, alert generation, and so forth. The illustrated method 70 enhances performance by using histogram images to improve accuracy (e.g., rather than attempting to calculate the average of RSSI values). Indeed, the histogram images are relatively immune to multiple signal propagation path complexities (e.g., signal reflections/bounces from various objects in the indoor space). Additionally, equipment and/or installation costs are reduced by using BLE components (e.g., coin-battery operated) rather than lidar, radar and/or 3D image recognition technology.

Figure 5A:
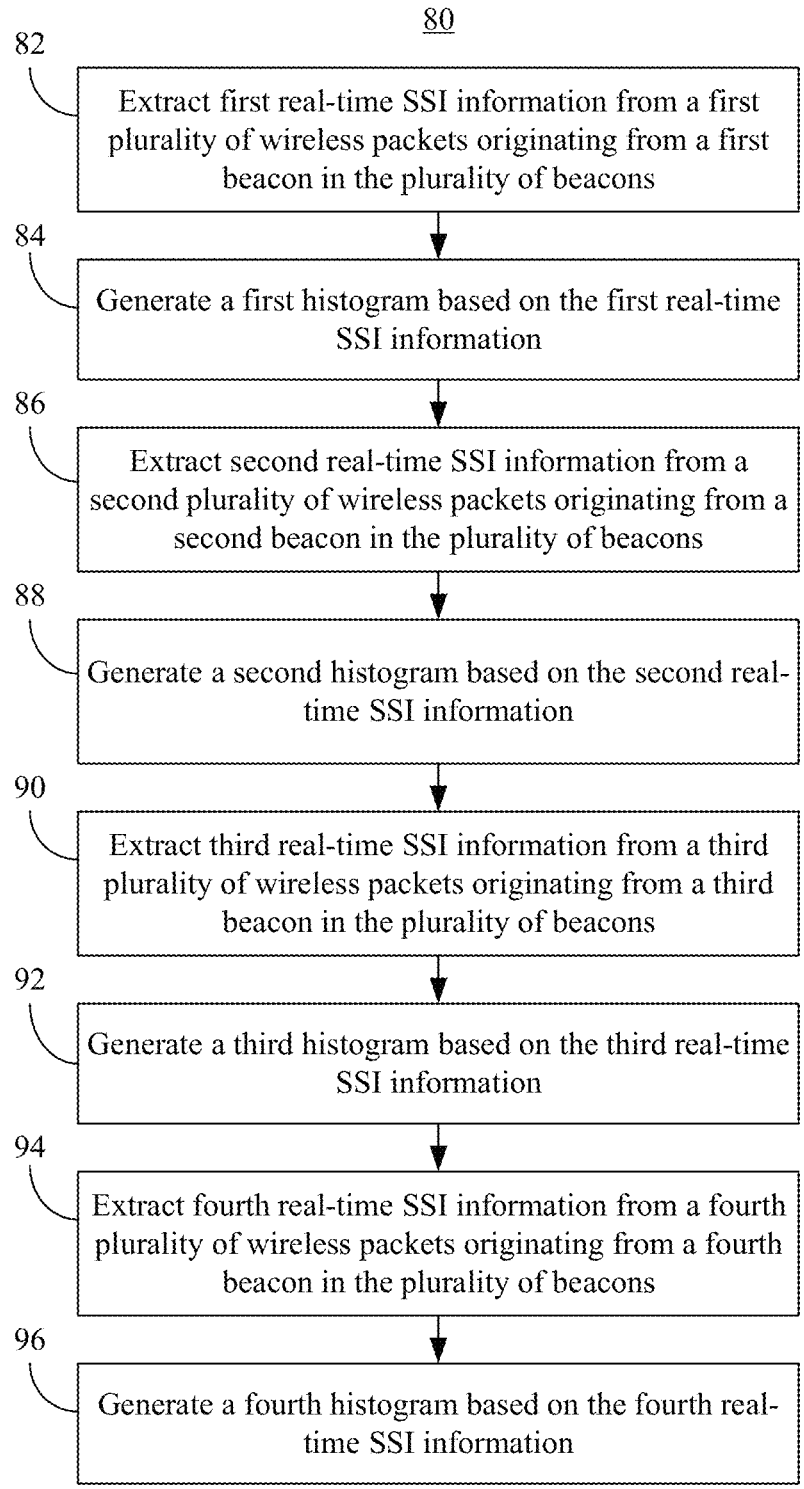
FIG. 5A is a flowchart of an example of a method of generating histograms according to an embodiment.

FIG. 5A shows a method 80 of generating histograms. The method 80 may generally be incorporated into block 72 (FIG. 4), already discussed. More particularly, the method 80 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 82 extracts first real-time SSI information from a first plurality of wireless packets originating from a first beacon in a plurality of beacons, where a first histogram is generated at block 84 based on the first real-time SSI information. In general, the first histogram may represent a signal strength distribution. Block 86 extracts second real-time SSI information from a second plurality of wireless packets originating from a second beacon in the plurality of beacons, where a second histogram is generated at block 88 based on the second real-time SSI information. Additionally, block 90 extracts third real-time SSI information from a third plurality of wireless packets originating from a third beacon in the plurality of beacons, where a third histogram is generated at block 92 based on the third real-time SSI information. Similarly, block 94 extracts fourth real-time SSI information from a fourth plurality of wireless packets originating from a fourth beacon in the plurality of beacons, where a fourth histogram is generated at block 96 based on the fourth real-time SSI information. The illustrated method 80 further enhances performance by using histograms/distributions rather than average RSSI values, which may present accuracy concerns.

Figure 5B:
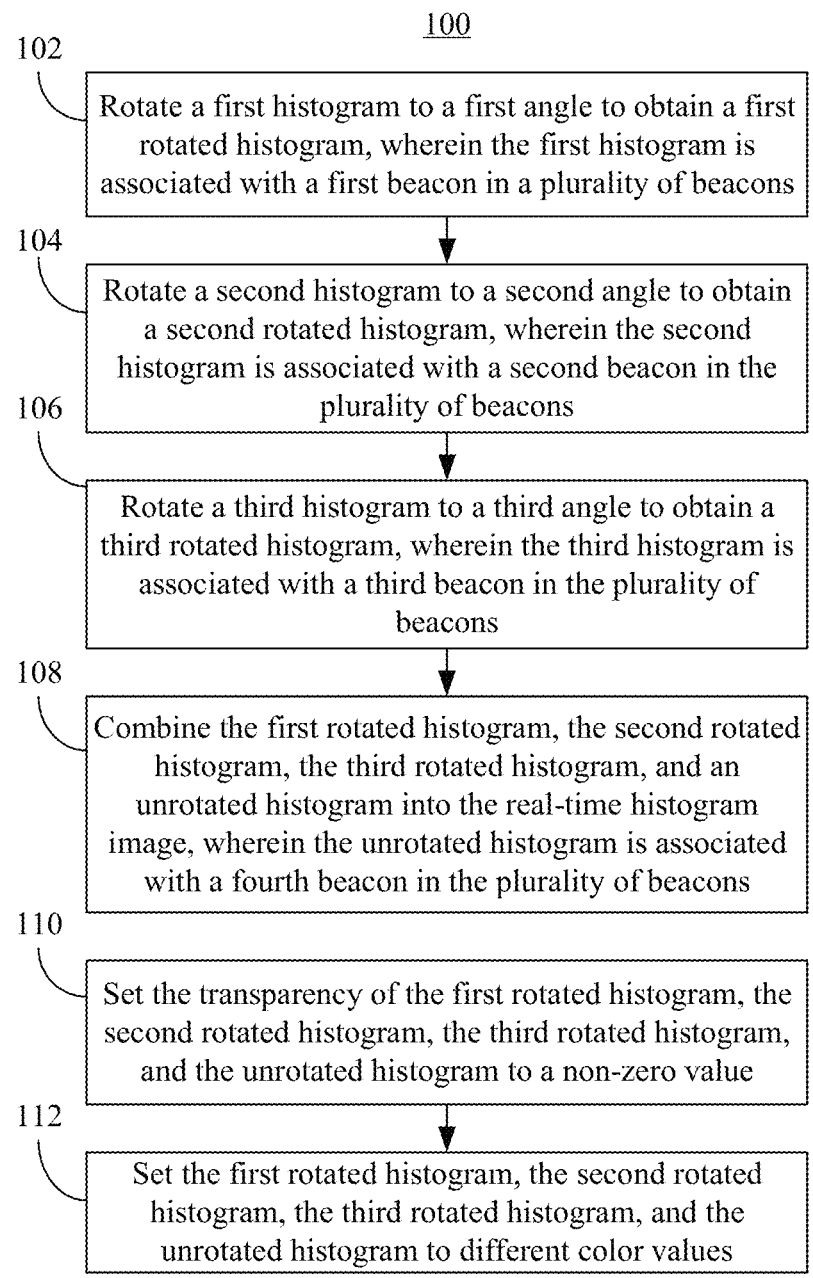
FIG. 5B is a flowchart of an example of a method of generating histogram images according to an embodiment.

FIG. 5B shows a method 100 of generating histogram images. The method 80 may generally be incorporated into block 74 (FIG. 4), already discussed. More particularly, the method 80 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 102 rotates a first histogram to a first angle (e.g., 90° clockwise) to obtain a first rotated histogram, wherein the first histogram is associated with a first beacon in a plurality of beacons. Block 104 rotates a second histogram to a second angle (e.g., 180°) to obtain a second rotated histogram, wherein the second histogram is associated with a second beacon in the plurality of beacons. Illustrated block 106 rotates a third histogram to a third angle (e.g., 270° clockwise) to obtain a third rotated histogram, wherein the third histogram is associated with a third beacon in the plurality of beacons. In an embodiment, block 108 combines the first rotated histogram, the second rotated histogram, the third rotated histogram, and an unrotated histogram into a real-time histogram image, wherein the unrotated histogram is associated with a fourth beacon in the plurality of beacons. As already noted, the number of beacons and/or histograms may vary depending on the circumstances.

In one example, block 110 sets the transparency of the first rotated histogram, the second rotated histogram, the third rotated histogram, and the unrotated histogram to a non-zero value (e.g., 25%). Additionally, block 112 may set the first rotated histogram, the second rotated histogram, the third rotated histogram, and the unrotated histogram to different color values. The illustrated method 100 therefore further enhances performance by providing for an electronic signature at each grid point in the 2D or 3D space.

Figure 6:
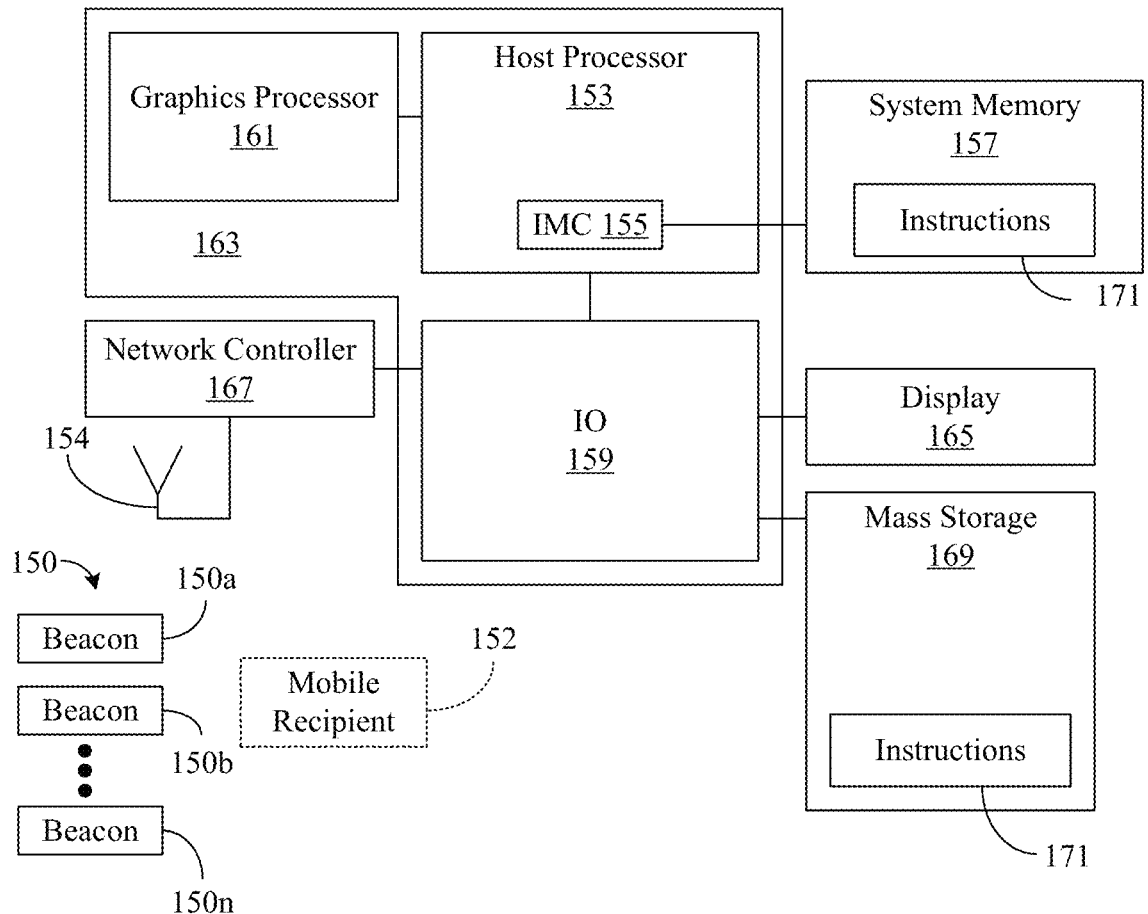
FIG. 6 is a block diagram of an example of a performance-enhanced computing system according to an embodiment.

Turning now to FIG. 6, a performance-enhanced computing system 151 is shown. The system 151 may generally be part of an electronic device/platform having computing functionality (e.g., personal digital assistant/PDA, notebook computer, tablet computer, convertible tablet, server), communications functionality (e.g., smart phone), imaging functionality (e.g., camera, camcorder), media playing functionality (e.g., smart television/TV), wearable functionality (e.g., watch, eyewear, headwear, footwear, jewelry), vehicular functionality (e.g., car, truck, motorcycle), robotic functionality (e.g., autonomous robot), Internet of Things (IoT) functionality, etc., or any combination thereof. In the illustrated example, the system 151 includes a host processor 153

(e.g., central processing unit/CPU) having an integrated memory controller (IMC) 155 that is coupled to a system memory 157.

The illustrated system 151 also includes an input output (IO) module 159 implemented together with the host processor 153 and a graphics processor 161 (e.g., graphics processing unit/GPU) on a semiconductor die 163 as a system on chip (SoC). The illustrated IO module 159 communicates with, for example, a display 165 (e.g., touch screen, liquid crystal display/LCD, light emitting diode/LED display), a network controller 167 (e.g., wired and/or wireless), and mass storage 169 (e.g., hard disk drive/HDD, optical disk, solid state drive/SSD, flash memory). The illustrated computing system 151 also includes a plurality of beacons 150 (150a-150n).

In an embodiment, the host processor 153, the graphics processor 161 and/or the IO module 159 execute instructions 171 retrieved from the system memory 157 and/or the mass storage 169 to perform one or more aspects of the method 60 (FIG. 3), the method 70 (FIG. 4), the method 80 (FIG. 5A) and/or the method 100 (FIG. 5B), already discussed. Thus, execution of the illustrated instructions 171 may cause the SoC to generate a real-time histogram image based on real-time SSI information associated with the plurality of beacons 150 when the plurality of beacons 150 are adjacent to an indoor area. Execution of the instructions 171 may also cause the SoC to input the real-time histogram image to a neural network and automatically determine a location of a mobile recipient 152 of the real-time SSI information in the indoor area based on an output of the neural network.

In an embodiment, the computing system 151 further includes an antenna 154 to receive wireless transmissions (e.g., BLE transmissions) and the computing system 151 is the mobile recipient 152 of the real-time SSI information. In one example, the wireless transmissions include a first plurality of wireless packets originating from a first beacon 150a in the plurality of beacons 150, a second beacon 150b in the plurality of beacons 150, a third beacon (not shown) in the plurality of beacons 150, and a fourth beacon (not shown) in the plurality of beacons 150. Thus, the illustrated computing system 151 may provide compute resources to the mobile recipient 152 and/or function as the mobile recipient 152 itself.

Execution of the instructions 171 may also cause the SoC to train the neural network as described herein. The illustrated computing system 151 is therefore considered to be performance-enhanced at least to the extent that it uses histogram images to improve accuracy (e.g., rather than attempting to calculate the average of RSSI values). Indeed, the histogram images are relatively immune to multiple signal propagation path complexities (e.g., signal reflections/bounces from various objects in the indoor space). Additionally, equipment and/or installation costs are reduced by using BLE components rather than lidar, radar and/or 3D image recognition technology.

Figure 7:
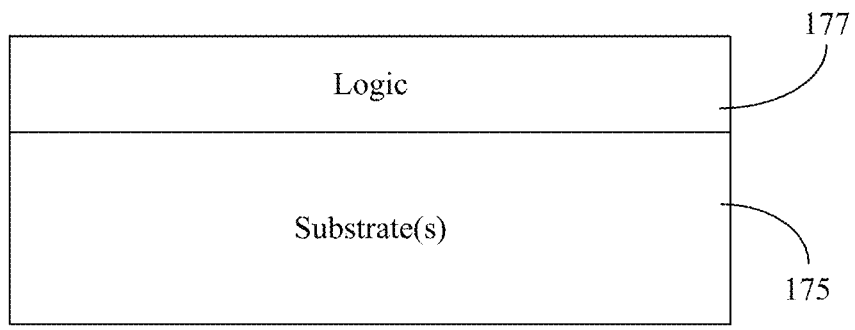
FIG. 7 is an illustration of an example of a semiconductor apparatus according to an embodiment.

FIG. 7 shows a semiconductor package apparatus 173. The illustrated apparatus 173 includes one or more substrates 175 (e.g., silicon, sapphire, gallium arsenide) and logic 177 (e.g., transistor array and other integrated circuit/IC components) coupled to the substrate(s) 175. The logic 177 may be implemented at least partly in configurable logic or fixed-functionality logic hardware. In one example, the logic 177 implements one or more aspects of the method 60 (FIG. 3), the method 70 (FIG. 4), the method 80 (FIG. 5A) and/or the method 100 (FIG. 5B), already discussed. Thus, the logic 177 may generate a real-time histogram image based on real-time SSI information associated with a plurality of beacons adjacent to an indoor area. The logic 177 may also input the real-time histogram image to a neural network and automatically determine a location of a mobile recipient of the real-time SSI information in the indoor area based on an output of the neural network. The logic 177 may also train the neural network as described herein.

The illustrated apparatus 173 is therefore considered to be performance-enhanced at least to the extent that it uses histogram images to improve accuracy (e.g., rather than attempting to calculate the average of RSSI values). Indeed, the histogram images are relatively immune to multiple signal propagation path complexities (e.g., signal reflections/bounces from various objects in the indoor space). Additionally, equipment and/or installation costs are reduced by using BLE components rather than lidar, radar and/or 3D image recognition technology.

In one example, the logic 177 includes transistor channel regions that are positioned (e.g., embedded) within the substrate(s) 175. Thus, the interface between the logic 177 and the substrate(s) 175 may not be an abrupt junction. The logic 177 may also be considered to include an epitaxial layer that is grown on an initial wafer of the substrate(s) 175.

Figure 8:
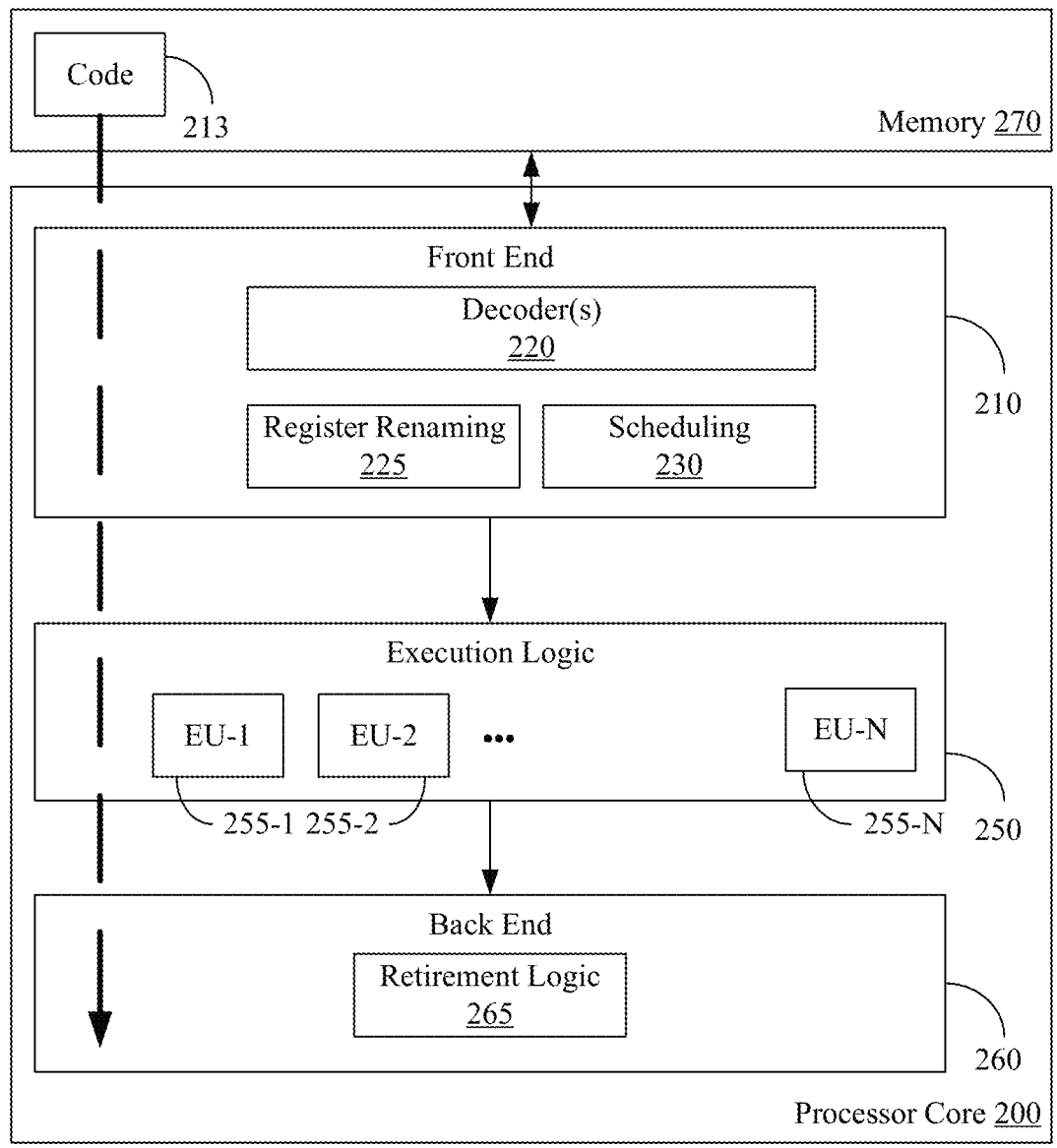
FIG. 8 is a block diagram of an example of a processor according to an embodiment.

FIG. 8 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 8, a processing element may alternatively include more than one of the processor core 200 illustrated in FIG. 8. The processor core 200 may be a single-threaded core or, for at least one embodiment, the processor core 200 may be multithreaded in that it may include more than one hardware thread context (or "logical processor") per core.

FIG. 8 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement one or more aspects of the method 60 (FIG. 3), the method 70 (FIG. 4), the method 80 (FIG. 5A) and/or the method 100 (FIG. 5B), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 8, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Referring now to FIG. 9, shown is a block diagram of a computing system 1000 embodiment in accordance with an embodiment. Shown in FIG. 9 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 9 may be implemented as a multi-drop bus rather than point-to-point interconnect.

As shown in FIG. 9, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 8.

Each processing element 1070, 1080 may include at least one shared cache 1896a, 1896b. The shared cache 1896a, 1896b may store data (e.g., instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 9, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 9, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 9, various I/O devices 1014 (e.g., biometric scanners, speakers, cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026, and a data storage unit 1019 such as a disk drive or other mass storage device which may include code 1030, in one embodiment. The illustrated code 1030 may implement one or more aspects of the method 60 (FIG. 3), the method 70 (FIG. 4), the method 80 (FIG. 5A) and/or the method 100 (FIG. 5B), already discussed. Further, an audio I/O 1024 may be coupled to second bus 1020 and a battery 1010 may supply power to the computing system 1000.

Note that other embodiments are contemplated. For example, instead of the point-to-point architecture of FIG. 9, a system may implement a multi-drop bus or another such communication topology. Also, the elements of FIG. 9 may alternatively be partitioned using more or fewer integrated chips than shown in FIG. 9.

Additional Notes and Examples

Example 1 includes a performance-enhanced computing system comprising a plurality of beacons, a processor, and a memory coupled to the processor, the memory including a set of executable program instructions, which when executed by the processor, cause the processor to generate a real-time histogram image based on real-time signal strength indicator (SSI) information associated with the plurality of beacons when the plurality of beacons are adjacent to an indoor area, input the real-time histogram image to a neural network, and automatically determine a location of a mobile recipient of the real-time SSI information in the indoor area based on an output of the neural network.

Example 2 includes the computing system of Example 1, wherein to generate the real-time histogram image, the instructions, when executed, cause the processor to rotate a first histogram to a first angle to obtain a first rotated histogram, wherein the first histogram is to be associated with a first beacon in the plurality of beacons, rotate a second histogram to a second angle to obtain a second rotated histogram, wherein the second histogram is to be associated with a second beacon in the plurality of beacons, rotate a third histogram to a third angle to obtain a third rotated histogram, wherein the third histogram is to be associated with a third beacon in the plurality of beacons, and combine the first rotated histogram, the second rotated histogram, the third rotated histogram and an unrotated histogram into the real-time histogram image, wherein the unrotated histogram is to be associated with a fourth beacon in the plurality of beacons.

Example 3 includes the computing system of Example 2, wherein to generate the real-time histogram image, the instructions, when executed, further cause the processor to set a transparency of the first rotated histogram, the second rotated histogram, the third rotated histogram, and the unrotated histogram to a non-zero value, and set the first rotated histogram, the second rotated histogram, the third rotated histogram, and the unrotated histogram to different color values.

Example 4 includes the computing system of Example 1, further including an antenna to receive wireless transmissions including a first plurality of wireless packets originating from a first beacon in the plurality of beacons, a second plurality of wireless packets originating from a second beacon in the plurality of beacons, a third plurality of wireless packets originating from a third beacon in the plurality of beacons, and a fourth plurality of wireless packets originating from a fourth beacon in the plurality of beacons, wherein the computing system is the mobile recipient of the real-time SSI information, and wherein the instructions, when executed, further cause the processor to extract first real-time SSI information from the first plurality of wireless packets, generate a first histogram based on the first real-time SSI information, extract second real-time SSI information from the second plurality of wireless packets, generate a second histogram based on the second real-time SSI information, extract third real-time SSI information from the third plurality of wireless packets, generate a third histogram based on the third real-time SSI information, extract fourth real-time SSI information from the fourth plurality of wireless packets, and generate a fourth histogram based on the fourth real-time SSI information.

Example 5 includes the computing system of Example 1, wherein the location is to be a grid point.

Example 6 includes the computing system of any one of Examples 1 to 5, wherein the instructions, when executed, further cause the processor to generate a set of training histogram images based on training SSI information from the plurality of beacons, and train the neural network based on the set of training histogram images.

Example 7 includes a semiconductor apparatus comprising one or more substrates, and logic coupled to the one or more substrates, wherein the logic is implemented at least partly in one or more of configurable logic or fixed-functionality hardware logic, the logic coupled to the one or more substrates to generate a real-time histogram image based on real-time signal strength indicator (SSI) information associated with a plurality of beacons adjacent to an indoor area, input the real-time histogram image to a neural network, and automatically determine a location of a mobile recipient of the real-time SSI information in the indoor area based on an output of the neural network.

Example 8 includes the semiconductor apparatus of Example 7, wherein to generate the real-time histogram image, the logic coupled to the one or more substrates is to rotate a first histogram to a first angle to obtain a first rotated histogram, wherein the first histogram is to be associated with a first beacon in the plurality of beacons, rotate a second histogram to a second angle to obtain a second rotated histogram, wherein the second histogram is to be associated with a second beacon in the plurality of beacons, rotate a third histogram to a third angle to obtain a third rotated histogram, wherein the third histogram is to be associated with a third beacon in the plurality of beacons, and combine the first rotated histogram, the second rotated histogram, the third rotated histogram and an unrotated histogram into the real-time histogram image, wherein the unrotated histogram is to be associated with a fourth beacon in the plurality of beacons.

Example 9 includes the semiconductor apparatus of Example 8, wherein to generate the real-time histogram image, the logic coupled to the one or more substrates is to set a transparency of the first rotated histogram, the second rotated histogram, the third rotated histogram, and the unrotated histogram to a non-zero value, and set the first rotated histogram, the second rotated histogram, the third rotated histogram, and the unrotated histogram to different color values.

Example 10 includes the semiconductor apparatus of Example 7, wherein the logic coupled to the one or more substrates is to extract first real-time SSI information from a first plurality of wireless packets originating from a first beacon in the plurality of beacons, generate a first histogram based on the first real-time SSI information, extract second real-time SSI information from a second plurality of wireless packets originating from a second beacon in the plurality of beacons, generate a second histogram based on the second real-time SSI information, extract third real-time SSI information from a third plurality of wireless packets originating from a third beacon in the plurality of beacons, generate a third histogram based on the third real-time SSI information, extract fourth real-time SSI information from a fourth plurality of wireless packets originating from a fourth beacon in the plurality of beacons, and generate a fourth histogram based on the fourth real-time SSI information.

Example 11 includes the semiconductor apparatus of Example 7, wherein the location is to be a grid point.

Example 12 includes the semiconductor apparatus of any one of Examples 7 to 11, wherein the logic coupled to the one or more substrates is to generate a set of training histogram images based on training SSI information from the plurality of beacons, and train the neural network based on the set of training histogram images.

Example 13 includes the semiconductor apparatus of any one of Examples 7 to 12, wherein the logic coupled to the one or more substrates includes transistor channel regions that are positioned within the one or more substrates.

Example 14 includes at least one computer-readable storage medium comprising a set of executable program instructions, which when executed by a computing system, cause the computing system to generate a real-time histogram image based on real-time signal strength indicator (SSI) information associated with a plurality of beacons adjacent to an indoor area, input the real-time histogram image to a neural network, and automatically determine a location of a mobile recipient of the real-time SSI information in the indoor area based on an output of the neural network.

Example 15 includes the at least one computer readable storage medium of Example 13, wherein to generate the real-time histogram image, the instructions, when executed, cause the computing system to rotate a first histogram to a first angle to obtain a first rotated histogram, wherein the first histogram is to be associated with a first beacon in the plurality of beacons, rotate a second histogram to a second angle to obtain a second rotated histogram, wherein the second histogram is to be associated with a second beacon in the plurality of beacons, rotate a third histogram to a third angle to obtain a third rotated histogram, wherein the third histogram is to be associated with a third beacon in the plurality of beacons, and combine the first rotated histogram, the second rotated histogram, the third rotated histogram and an unrotated histogram into the real-time histogram image, wherein the unrotated histogram is to be associated with a fourth beacon in the plurality of beacons.

Example 16 includes the at least one computer readable storage medium of Example 15, wherein to generate the real-time histogram image, the instructions, when executed, further cause the computing system to set a transparency of the first rotated histogram, the second rotated histogram, the third rotated histogram, and the unrotated histogram to a non-zero value, and set the first rotated histogram, the second rotated histogram, the third rotated histogram, and the unrotated histogram to different color values.

Example 17 includes the at least one computer readable storage medium of Example 14, wherein the instructions, when executed, further cause the computing system to extract first real-time SSI information from a first plurality of wireless packets originating from a first beacon in the plurality of beacons, generate a first histogram based on the first real-time SSI information, extract second real-time SSI information from a second plurality of wireless packets originating from a second beacon in the plurality of beacons, generate a second histogram based on the second real-time SSI information, extract third real-time SSI information from a third plurality of wireless packets originating from a third beacon in the plurality of beacons, generate a third histogram based on the third real-time SSI information, extract fourth real-time SSI information from a fourth plurality of wireless packets originating from a fourth beacon in the plurality of beacons, and generate a fourth histogram based on the fourth real-time SSI information.

Example 18 includes the at least one computer readable storage medium of Example 14, wherein the location is to be a grid point.

Example 19 includes the at least one computer readable storage medium of any one of Examples 14 to 18, wherein the instructions, when executed, further cause the computing system to generate a set of training histogram images based on training SSI information from the plurality of beacons, and train the neural network based on the set of training histogram images.

Example 20 includes a method of operating a performance-enhanced computing system, the method comprising generating a real-time histogram image based on real-time signal strength indicator (SSI) information associated with a plurality of beacons adjacent to an indoor area, inputting the real-time histogram image to a neural network, and automatically determining a location of a mobile recipient of the real-time SSI information in the indoor area based on an output of the neural network.

Example 21 includes the method of Example 20, wherein generating the real-time histogram image includes rotating a first histogram to a first angle to obtain a first rotated histogram, wherein the first histogram is associated with a first beacon in the plurality of beacons, rotating a second histogram to a second angle to obtain a second rotated histogram, wherein the second histogram is associated with a second beacon in the plurality of beacons, rotating a third histogram to a third angle to obtain a third rotated histogram, wherein the third histogram is associated with a third beacon in the plurality of beacons, and combining the first rotated histogram, the second rotated histogram, the third rotated histogram and an unrotated histogram into the real-time histogram image, wherein the unrotated histogram is associated with a fourth beacon in the plurality of beacons.

Example 22 includes the method of Example 21, wherein generating the real-time histogram image further includes setting a transparency of the first rotated histogram, the second rotated histogram, the third rotated histogram, and the unrotated histogram to a non-zero value, and setting the first rotated histogram, the second rotated histogram, the third rotated histogram, and the unrotated histogram to different color values.

Example 23 includes the method of Example 20, further including extracting first real-time SSI information from a first plurality of wireless packets originating from a first beacon in the plurality of beacons, generating a first histogram based on the first real-time SSI information, extracting second real-time SSI information from a second plurality of wireless packets originating from a second beacon in the plurality of beacons, generating a second histogram based on the second real-time SSI information, extracting third real-time SSI information from a third plurality of wireless packets originating from a third beacon in the plurality of beacons, generating a third histogram based on the third real-time SSI information, extracting fourth real-time SSI information from a fourth plurality of wireless packets originating from a fourth beacon in the plurality of beacons, and generating a fourth histogram based on the fourth real-time SSI information.

Example 24 includes the method of Example 20, wherein the location is a grid point.

Example 25 includes the method of any one of Examples 20 to 24, further including generating a set of training histogram images based on training SSI information from the plurality of beacons, and training the neural network based on the set of training histogram images.

Thus, technology described herein achieves neural network training and inference using histogram fingerprint maps that are very light-weight and yet accurate. Accordingly training and inference may be performed on a relatively inexpensive low-power training servers and edge devices, such as mobile phones.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the computing system within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

I claim:

1. A computing system comprising:
   a plurality of beacons;
   a processor; and
   a memory coupled to the processor, the memory including a set of executable program instructions, which when executed by the processor, cause the processor to:
   generate a real-time histogram image based on real-time signal strength indicator (SSI) information associated with the plurality of beacons when the plurality of beacons are adjacent to an indoor area,
   input the real-time histogram image to a neural network, and
   automatically determine a location of a mobile recipient of the real-time SSI information in the indoor area based on an output of the neural network.

2. The computing system of claim 1, wherein to generate the real-time histogram image, the instructions, when executed, cause the processor to:
   rotate a first histogram to a first angle to obtain a first rotated histogram, wherein the first histogram is to be associated with a first beacon in the plurality of beacons,
   rotate a second histogram to a second angle to obtain a second rotated histogram, wherein the second histogram is to be associated with a second beacon in the plurality of beacons;
   rotate a third histogram to a third angle to obtain a third rotated histogram, wherein the third histogram is to be associated with a third beacon in the plurality of beacons; and
   combine the first rotated histogram, the second rotated histogram, the third rotated histogram and an unrotated histogram into the real-time histogram image, wherein the unrotated histogram is to be associated with a fourth beacon in the plurality of beacons.

3. The computing system of claim 2, wherein to generate the real-time histogram image, the instructions, when executed, further cause the processor to:
   set a transparency of the first rotated histogram, the second rotated histogram, the third rotated histogram, and the unrotated histogram to a non-zero value; and
   set the first rotated histogram, the second rotated histogram, the third rotated histogram, and the unrotated histogram to different color values.

4. The computing system of claim 1, further including an antenna to receive wireless transmissions including a first plurality of wireless packets originating from a first beacon in the plurality of beacons, a second plurality of wireless packets originating from a second beacon in the plurality of beacons, a third plurality of wireless packets originating from a third beacon in the plurality of beacons, and a fourth plurality of wireless packets originating from a fourth beacon in the plurality of beacons, wherein the computing system is the mobile recipient of the real-time SSI information, and wherein the instructions, when executed, further cause the processor to:
   extract first real-time SSI information from the first plurality of wireless packets;
   generate a first histogram based on the first real-time SSI information;
   extract second real-time SSI information from the second plurality of wireless packets;
   generate a second histogram based on the second real-time SSI information;
   extract third real-time SSI information from the third plurality of wireless packets;
   generate a third histogram based on the third real-time SSI information;
   extract fourth real-time SSI information from the fourth plurality of wireless packets; and
   generate a fourth histogram based on the fourth real-time SSI information.

5. The computing system of claim 1, wherein the location is to be a grid point.

6. The computing system of claim 1, wherein the instructions, when executed, further cause the processor to:
   generate a set of training histogram images based on training SSI information from the plurality of beacons; and
   train the neural network based on the set of training histogram images.

7. A semiconductor apparatus comprising:
   one or more substrates; and
   logic coupled to the one or more substrates, wherein the logic is implemented at least partly in one or more of configurable logic or fixed-functionality hardware logic, the logic coupled to the one or more substrates to:

generate a real-time histogram image based on real-time signal strength indicator (SSI) information associated with a plurality of beacons adjacent to an indoor area, input the real-time histogram image to a neural network, and automatically determine a location of a mobile recipient of the real-time SSI information in the indoor area based on an output of the neural network.

8. The semiconductor apparatus of claim 7, wherein to generate the real-time histogram image, the logic coupled to the one or more substrates is to:

rotate a first histogram to a first angle to obtain a first rotated histogram, wherein the first histogram is to be associated with a first beacon in the plurality of beacons, rotate a second histogram to a second angle to obtain a second rotated histogram, wherein the second histogram is to be associated with a second beacon in the plurality of beacons, rotate a third histogram to a third angle to obtain a third rotated histogram, wherein the third histogram is to be associated with a third beacon in the plurality of beacons, and combine the first rotated histogram, the second rotated histogram, the third rotated histogram and an unrotated histogram into the real-time histogram image, wherein the unrotated histogram is to be associated with a fourth beacon in the plurality of beacons.

9. The semiconductor apparatus of claim 8, wherein to generate the real-time histogram image, the logic coupled to the one or more substrates is to:

set a transparency of the first rotated histogram, the second rotated histogram, the third rotated histogram, and the unrotated histogram to a non-zero value, and set the first rotated histogram, the second rotated histogram, the third rotated histogram, and the unrotated histogram to different color values.

10. The semiconductor apparatus of claim 7, wherein the logic coupled to the one or more substrates is to:

extract first real-time SSI information from a first plurality of wireless packets originating from a first beacon in the plurality of beacons;

generate a first histogram based on the first real-time SSI information;

extract second real-time SSI information from a second plurality of wireless packets originating from a second beacon in the plurality of beacons;

generate a second histogram based on the second real-time SSI information;

extract third real-time SSI information from a third plurality of wireless packets originating from a third beacon in the plurality of beacons;

generate a third histogram based on the third real-time SSI information;

extract fourth real-time SSI information from a fourth plurality of wireless packets originating from a fourth beacon in the plurality of beacons; and generate a fourth histogram based on the fourth real-time SSI information.

11. The semiconductor apparatus of claim 7, wherein the location is to be a grid point.

12. The semiconductor apparatus of claim 7, wherein the logic coupled to the one or more substrates is to:

generate a set of training histogram images based on training SSI information from the plurality of beacons, and train the neural network based on the set of training histogram images.

13. The semiconductor apparatus of claim 7, wherein the logic coupled to the one or more substrates includes transistor channel regions that are positioned within the one or more substrates.

14. At least one non-transitory computer-readable storage medium comprising a set of executable program instructions, which when executed by a computing system, cause the computing system to:

generate a real-time histogram image based on real-time signal strength indicator (SSI) information associated with a plurality of beacons adjacent to an indoor area;

input the real-time histogram image to a neural network; and automatically determine a location of a mobile recipient of the real-time SSI information in the indoor area based on an output of the neural network.

15. The at least one non-transitory computer readable storage medium of claim 14, wherein to generate the real-time histogram image, the instructions, when executed, cause the computing system to:

rotate a first histogram to a first angle to obtain a first rotated histogram, wherein the first histogram is to be associated with a first beacon in the plurality of beacons;

rotate a second histogram to a second angle to obtain a second rotated histogram, wherein the second histogram is to be associated with a second beacon in the plurality of beacons;

rotate a third histogram to a third angle to obtain a third rotated histogram, wherein the third histogram is to be associated with a third beacon in the plurality of beacons; and combine the first rotated histogram, the second rotated histogram, the third rotated histogram and an unrotated histogram into the real-time histogram image, wherein the unrotated histogram is to be associated with a fourth beacon in the plurality of beacons.

16. The at least one non-transitory computer readable storage medium of claim 15, wherein to generate the real-time histogram image, the instructions, when executed, further cause the computing system to:

set a transparency of the first rotated histogram, the second rotated histogram, the third rotated histogram, and the unrotated histogram to a non-zero value; and set the first rotated histogram, the second rotated histogram, the third rotated histogram, and the unrotated histogram to different color values.

17. The at least one non-transitory computer readable storage medium of claim 14, wherein the instructions, when executed, further cause the computing system to:

extract first real-time SSI information from a first plurality of wireless packets originating from a first beacon in the plurality of beacons;

generate a first histogram based on the first real-time SSI information;

extract second real-time SSI information from a second plurality of wireless packets originating from a second beacon in the plurality of beacons;

generate a second histogram based on the second real-time SSI information;

extract third real-time SSI information from a third plurality of wireless packets originating from a third beacon in the plurality of beacons;
generate a third histogram based on the third real-time SSI information;
extract fourth real-time SSI information from a fourth plurality of wireless packets originating from a fourth beacon in the plurality of beacons; and
generate a fourth histogram based on the fourth real-time SSI information.

18. The at least one non-transitory computer readable storage medium of claim 14, wherein the location is to be a grid point.

19. The at least one non-transitory computer readable storage medium of claim 14, wherein the instructions, when executed, further cause the computing system to:
generate a set of training histogram images based on training SSI information from the plurality of beacons; and
train the neural network based on the set of training histogram images.

20. A method comprising:
generating a real-time histogram image based on real-time signal strength indicator (SSI) information associated with a plurality of beacons adjacent to an indoor area;
inputting the real-time histogram image to a neural network; and
automatically determining a location of a mobile recipient of the real-time SSI information in the indoor area based on an output of the neural network.

21. The method of claim 20, wherein generating the real-time histogram image includes:
rotating a first histogram to a first angle to obtain a first rotated histogram, wherein the first histogram is associated with a first beacon in the plurality of beacons;
rotating a second histogram to a second angle to obtain a second rotated histogram, wherein the second histogram is associated with a second beacon in the plurality of beacons;
rotating a third histogram to a third angle to obtain a third rotated histogram, wherein the third histogram is associated with a third beacon in the plurality of beacons; and
combining the first rotated histogram, the second rotated histogram, the third rotated histogram and an unrotated histogram into the real-time histogram image, wherein the unrotated histogram is associated with a fourth beacon in the plurality of beacons.

22. The method of claim 21, wherein generating the real-time histogram image further includes:
setting a transparency of the first rotated histogram, the second rotated histogram, the third rotated histogram, and the unrotated histogram to a non-zero value; and
setting the first rotated histogram, the second rotated histogram, the third rotated histogram, and the unrotated histogram to different color values.

23. The method of claim 20, further including:
extracting first real-time SSI information from a first plurality of wireless packets originating from a first beacon in the plurality of beacons;
generating a first histogram based on the first real-time SSI information;
extracting second real-time SSI information from a second plurality of wireless packets originating from a second beacon in the plurality of beacons;
generating a second histogram based on the second real-time SSI information;
extracting third real-time SSI information from a third plurality of wireless packets originating from a third beacon in the plurality of beacons;
generating a third histogram based on the third real-time SSI information;
extracting fourth real-time SSI information from a fourth plurality of wireless packets originating from a fourth beacon in the plurality of beacons; and
generating a fourth histogram based on the fourth real-time SSI information.

24. The method of claim 20, wherein the location is a grid point.

25. The method of claim 20, further including:
generating a set of training histogram images based on training SSI information from the plurality of beacons; and
training the neural network based on the set of training histogram images.

* * * * *